Figure 2:
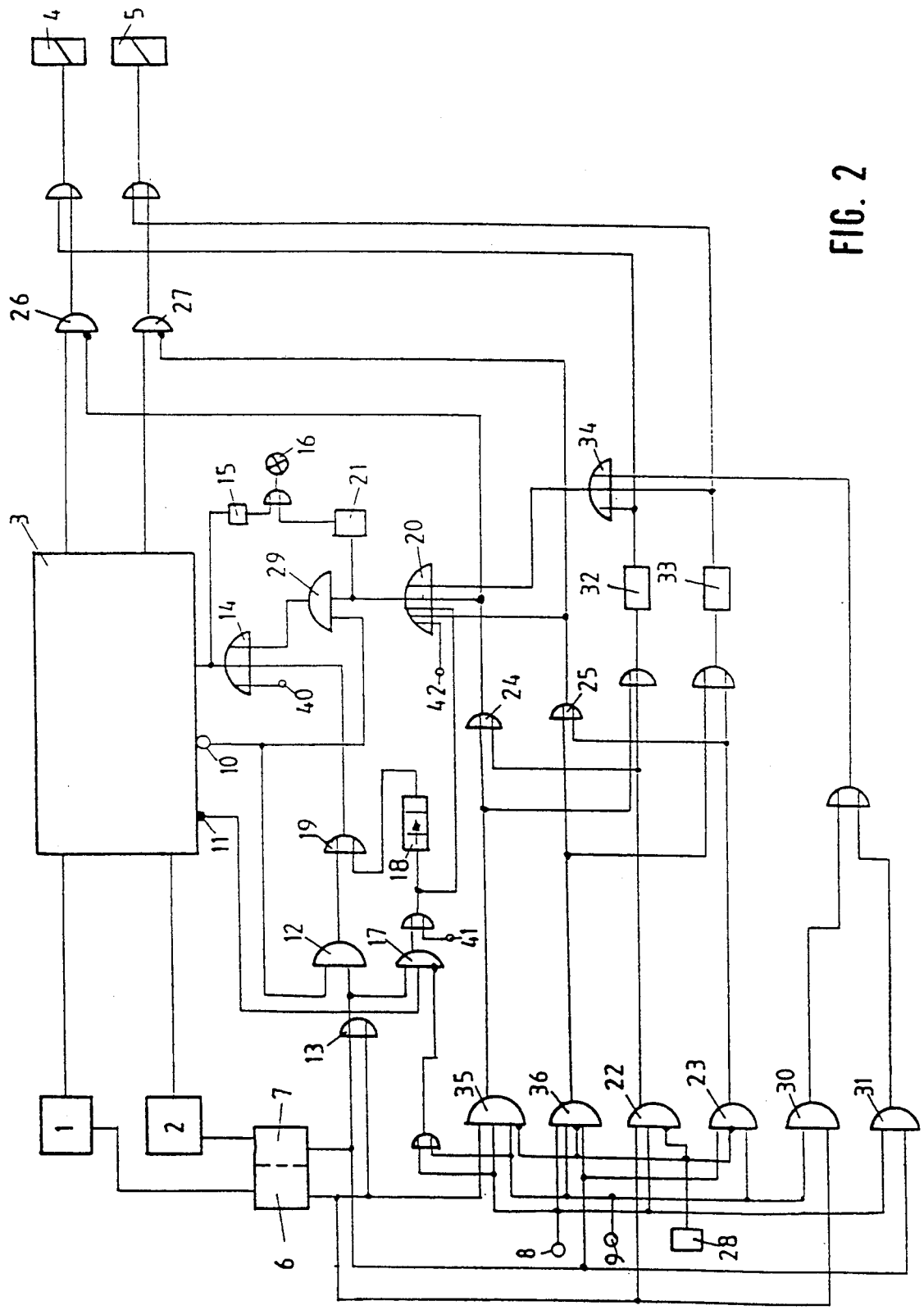

United States Patent [19]

Müller et al.

[11] Patent Number: 5,236,254
[45] Date of Patent: Aug. 17, 1993

[54] ANTI-LOCK BRAKE PRESSURE CONTROL SYSTEM WITH FAILURE MODE

[75] Inventors: Elmar Müller, Markgröningen, Fed. Rep. of Germany; Werner Müller, Yokohama, Japan

[73] Assignee: Robert Bosch GmbH, Stuttgart, Fed. Rep. of Germany

[21] Appl. No.: 859,447

[22] PCT Filed: Sep. 13, 1990

[86] PCT No.: PCT/EP90/01553
§ 371 Date: May 29, 1992
§ 102(e) Date: May 29, 1992

[87] PCT Pub. No.: WO91/04897
PCT Pub. Date: Apr. 18, 1991

[30] Foreign Application Priority Data

Sep. 29, 1989 [DE] Fed. Rep. of Germany ....... 3932638

[51] Int. Cl.⁵ .................... B60T 8/66; B60T 17/22
[52] U.S. Cl. ....................... 303/92; 188/1.11
[58] Field of Search ............ 303/92; 188/1.11; 364/426.01–426.03

[56] References Cited

U.S. PATENT DOCUMENTS

| | | | |
|---|---|---|---|
| 3,711,827 | 1/1973 | Houseman | 340/459 |
| 3,874,743 | 4/1975 | Fleischer et al. | 303/92 |
| 3,883,184 | 5/1975 | Jonner et al. | 303/92 |
| 3,920,280 | 11/1975 | Luhdorff et al. | 303/92 |
| 3,930,687 | 1/1976 | Amano | 303/92 |
| 4,009,914 | 3/1977 | Sato et al. | 303/92 |
| 4,425,622 | 1/1984 | Arikawa | 303/92 X |
| 4,876,527 | 10/1989 | Oka et al. | 303/92 X |
| 5,125,483 | 6/1992 | Kitagawa et al. | 188/1.11 X |

FOREIGN PATENT DOCUMENTS

| | | |
|---|---|---|
| 0177310 | 4/1986 | European Pat. Off. . |
| 2232034 | 1/1974 | Fed. Rep. of Germany . |
| 2604148 | 8/1977 | Fed. Rep. of Germany . |
| 2702800 | 7/1978 | Fed. Rep. of Germany . |
| 3102108 | 1/1982 | Fed. Rep. of Germany . |
| 3102227 | 1/1982 | Fed. Rep. of Germany . |
| 3119064 | 2/1982 | Fed. Rep. of Germany . |
| 3447449 | 7/1985 | Fed. Rep. of Germany . |
| 2474417 | 7/1981 | France . |
| 227548 | 12/1984 | Japan .................... 303/92 |
| 230852 | 12/1984 | Japan .................... 303/92 |
| 188558 | 8/1988 | Japan .................... 303/92 |
| 2068068 | 8/1981 | United Kingdom ......... 303/92 |
| 2158905 | 11/1985 | United Kingdom . |
| 2209572 | 5/1989 | United Kingdom ......... 303/92 |

*Primary Examiner*—Robert J. Oberleitner
*Assistant Examiner*—Alfred Muratori
*Attorney, Agent, or Firm*—Spencer, Frank & Schneider

[57] ABSTRACT

A brake pressure controller, for example an anti-lock control system, is disclosed which includes fault monitoring. If a fault occurs, limited control operation is maintained initially and only later is the controller shut down. The limited control operation and the shut-down controller are indicated by different warning signals.

6 Claims, 2 Drawing Sheets

| Brake Actuation | Time of Occurrence of Fault | Rev. Sensor Fault Front Wheel | Rev. Sensor Fault Rear Wheel | Magnetic Valve | Pump Motor | Sub-Normal Voltage | Electronic Control Unit | Valve Relay | Brake Light Switch Line Interruption | Reservoir Switch |
|---|---|---|---|---|---|---|---|---|---|---|
| 1 | 2 | 3 | 4 | 5 | 6 | 7 | 8 | 9 | 10 | 11 |
| none | standstill | 1.1.1 | 1.1.2 | 1.1.3 | 1.1.4 | 1.1.5 | 1.1.6 | 1.1.7 | 1.1.8 | 1.1.9 |
| none | constant travel | 1.2.1 | 1.2.2 | 1.2.3 | 1.2.4 | 1.2.5 | 1.2.6 | 1.2.7 | 1.2.8 | 1.2.9 |
| front wheel | before control | 2.1.1 | 2.1.2 | 2.1.3 | 2.1.4 | 2.1.5 | 2.1.6 | 2.1.7 | 2.1.8 | 2.1.9 |
| rear wheel | before control | 2.2.1 | 2.2.2 | 2.2.3 | 2.2.4 | 2.2.5 | 2.2.6 | 2.2.7 | 2.2.8 | 2.2.9 |
| front & rear | before control | 2.3.1 | 2.3.2 | 2.3.3 | 2.3.4 | 2.3.5 | 2.3.6 | 2.3.7 | 2.3.8 | 2.3.9 |
| front wheel | during control | 3.1.1 | 3.1.2 | 3.1.3 | 3.1.4 | 3.1.5 | 3.1.6 | 3.1.7 | 3.1.8 | 3.1.9 |
| rear wheel | during control | 3.2.1 | 3.2.2 | 3.2.3 | 3.2.4 | 3.2.5 | 3.2.6 | 3.2.7 | 3.2.8 | 3.2.9 |
| front & rear | during control | 3.3.1 | 3.3.2 | 3.3.3 | 3.3.4 | 3.3.5 | 3.3.6 | 3.3.7 | 3.3.8 | 3.3.9 |

FIG. 1

ANTI-LOCK BRAKE PRESSURE CONTROL SYSTEM WITH FAILURE MODE

STATE OF THE ART

German Unexamined Published Patent Application DE-OS 2,232,034 discloses an anti-lock control system which monitors the response time of the brake pressure control valves. If the response time exceeds a predetermined value, the system is normally shut down and a warning light is actuated with a continuous signal. If, however, at the time of the intended shutdown, certain wheel states exist, the system is not shut down but an alternating pressure buildup and pressure reduction takes place for a period of time at both wheels of an axle, that is a type of automatic pumping of the brakes occurs.

ADVANTAGES OF THE INVENTION

The configuration of the system according to the invention calls the driver's attention to the limited control operation. This is particularly important in connection with two-wheeled motor vehicles.

DESCRIPTION OF THE DRAWINGS FIGURES

A motorcycle anti-lock control system will be described with reference to the drawings in which a plurality of monitoring devices monitor the occurrence of faults. The faults are classified according to the type of fault and the circumstances under which the faults occur. The reaction that is then initiated is a function of the fault classification, namely an immediate shutdown or initially maintained limited control operation and then shutdown of the controller.

The table of FIG. 1 classifies the possible faults for various situations.

Column 1 indicates in each case, whether and where braking takes place.

Column 2 lists various event times for the malfunctioning of individual components (columns 3 to 11), with the individual expressions representing the following:

standstill: fault occurs when the vehicle is stopped;
constant travel: fault occurs during travel;
before control: fault occurs during travel with partial braking or initially without braking and brake actuation during the warning period;
during control: fault occurs during an ALS [anti-lock system] control.

Thus 2.3.1, for example, signifies the following.

During unbraked (or partially braked) travel, the revolution sensor at the front wheel malfunctions, thus eliminating the control system (by way of a slip signal and/or a deceleration signal). Then both wheels are braked into the warning period.

In the table of FIG. 1, five fault categories are derived with respect to the processing of revolution sensor errors, which cause different reactions to take place.
Fault Category 1 includes faults 1.1.1 and 1.1.2, with the following reaction.
(a) The ALS system is shut down at once.
(b) The warning light is actuated with a continuous signal. The normal brake system is available.

Fault Category 2 includes faults 1.2.1 and 1.2.2, with the following reaction.
(a) The ALS system is shut down after a warning period of, for example, 10 seconds.
(b) The warning light is pulsed during the warning period; after the shutdown, it is actuated with a continuous signal. After shutdown, the normal brake system is available.

Fault Category 3 includes faults 2.1.1, 2.2.2, 3.1.1, 3.2.2, with the following reaction.
(a) After a fault has been detected, limited ALS operation is effective, namely until the end of the control cycle or until the vehicle is stopped; then the system is shut down. During the limited ALS operation, pulsed pressure is built up through a 3/3 solenoid valve at the defective wheel until a calculated or measured deceleration of 0.3G has been reached; then pressure is maintained.
(b) During the limited operation, the warning light is actuated in a pulsed manner; then (after shutdown) continuous actuation takes place. After shutdown, the normal brake system is available Fault Category 4 includes the faults 2.1.2, 2.2.1, 3.1.2, 3.2.1, with the following reaction.
(a) Here again limited ALS operation is effective after the detection of the fault until the end of the control cycle or the vehicle is stopped; then the system is shut down. The limited ALS operation comprises a normal control of the brake pressure of the properly operating wheel, with limited reference formation (only the controlled wheel contributes).
(b) During the limited operation, the warning light is actuated in a pulsed manner; after shutdown it is actuated constantly. After shutdown the normal brake system is available.

Fault Category 5 includes faults 2.3.1, 2.3.2, 3.3.1, 3.3.2, with the following reaction.
(a) After detection of the fault, limited ALS operation is maintained until the end of the control cycle or until the vehicle is stopped; then the system is shut down. During the limited ALS operation, normal control of the properly operating wheel is maintained with limited reference formation. In addition, there is a pulsed pressure buildup through the 3/3 solenoid valve at the wheel having the defective sensor until a calculated or measured vehicle deceleration of 0.3G is realized; then pressure is maintained at the defective wheel.
(b) During the limited operation, the warning light is actuated in a pulsed manner. After shutdown, actuation is continuous. After shutdown of the ALS the normal brake system is available.

The following applies for the other faults listed in the table.
(a) The ALS is shut down immediately in the case of faults 1.1.3 (a valve is malfunctioning), 1.1.4 (pump motor defective), 1.1.5 (subnormal voltage is detected); 1.1.6 to 3.3.6 (fault in the electronic system), 1.1.7 to 3.3.7 (defect at the valve relay), 1.1.8 (power interrupted at the brake light switch) and 1.1.9 (a switch malfunctions in the hydraulic reservoir).
(b) The ALS is shut down after a warning period of, for example, 10 seconds in the case of faults 1.2.3, 2.1.3, 2.2.3 and 2.3.3 (a solenoid valve is malfunctioning under various circumstances), 1.2.4, 2.1.4, 2.2.4 and 2.3.4 (pump motor malfunctioning under various circumstances), 1.2.5, 2.1.5, 2.2.5 and 2.3.5 (sub-normal voltage occurs under various circumstances), 1.2.8, 2.1.8, 2.2.8 and 2.3.8 (power interrupted at the brake light switch under various circumstances) and 1.2.9, 2.1.9, 2.2.9 and 2.3.9 (occurrence of a reservoir switch fault under various circumstances).

(c) Finally, the ALS system is shut down only if the control cycle is completed or the motorcycle has come to a stop in cases 3.1.3, 3.2.3 and 3.3.3 (a solenoid valve malfunctioning during the control cycle), 3.1.4, 3.2.4 and 3.3.4 (pump motor malfunction during the control cycle), 3.1.5, 3.2.5 and 3.3.5 (occurrence of a sub-normal voltage during the control cycle); 3.1.8, 3.2.8 and 3.3.8 (power interruption in BLS [brake light switch] during the control cycle), and 3.1.9, 3.2.9 and 3.3.9 (reservoir switch fault during the control cycle).

In cases (b) and (c) the warning light is actuated in a pulsed manner from the moment the fault is detected until the system is completely shut down, then actuation is continuous.

One embodiment for the realization of the above reactions to the malfunctioning of a sensor is shown in FIG. 2 of the drawings. There, sensors associated with the two vehicle wheels are marked 1 and 2, an evaluation circuit is marked 3 and a solenoid valve associated with each of the wheel brakes is marked 4 and 5, respectively. Corresponding to the wheel motion behavior as determined by sensors 1 and 2, the brake pressure at the wheel brakes is varied.

Monitoring blocks 6 and 7 monitor sensors 1 and 2. Monitoring blocks 6 or 7 put out a signal if the associated sensor is defective. A signal is present at a terminal 8 if the front wheel brake is actuated A signal is present at a terminal 9 if the rear wheel brake is actuated By way of a terminal 10, evaluation circuit 3 emits a signal if the vehicle is stopped and by way of terminal 11 if the vehicle is traveling.

Fault Category 1

If one of sensors 1 or 2 becomes defective during a stop, an AND gate 12 is enabled (by way of terminal 10 and an OR gate 13) and puts out a shutdown signal to evaluation circuit 3 (via an OR gate 14). At the same time, this signal flips a bistable member 15 which then actuates a warning light 16 (continuous signal).

Fault Category 2

If the vehicle is traveling (signal present at terminal 11) and a sensor is malfunctioning, an AND gate 17 is enabled—assuming no brake actuation takes place—and starts a timing member 18 which, after a predetermined time, shuts down the ALS by way of an OR gate 19 and an OR gate 14. During the waiting time of timing member 18, the output signal of AND gate 17 activates by way of an OR gate 20 a pulse generator 21 which actuates warning light 16 in a pulsed manner until subsequently the warning light is fully actuated by the shutdown signal and by bistable member 15.

Fault Category 3

By means of AND gates 22 and 23 it is determined whether sensor 1 or sensor 2 is malfunctioning at a braked wheel. If this is the case, the actuation of one of valves 4 or 5 is interrupted by way of an OR gate 24 or 25 and an AND gate 26 or 27 so that pressure is built up at the associated brakes. The blocking signal ends if, for example, a vehicle deceleration sensor 28 emits a signal when a vehicle deceleration of, for example, 0.3G is reached and blocks AND gate 22 or 23. The trailing edge of the output signal of one of AND gates 22 or 23 actuates one of the bistable members 32 or 33 which now brings the solenoid valve 4 or 5 of the wheel having the malfunctioning sensor into the constantly holding position and thus maintains the adjusted pressure. During the period of limited ALS operation, a warning light 16 is actuated in a pulsed manner by way of OR gate 20. Once the vehicle stops, shutdown is initiated by way of an OR gate 34, OR gate 20 and an AND gate 29 and warning light 16 is actuated to be lit continuously.

Fault Category 4

Here a check is made by means of AND gates 30 and 31 whether the sensor of the non-braked vehicle wheel is malfunctioning. The then generated output signal of one of the AND gates 30 or 31 does not influence the braked wheel whose sensor is operating properly, but initially initiates by way of OR gates 34 and 20 a pulsed warning light actuation which then, as soon as the vehicle is stopped and the ALS is shut down, changes to continuous actuation. Not shown is a connection between AND gates 30 and 31 and evaluation circuit 3 which causes a switch in the evaluation circuit to reference formation with the still operable sensor.

Fault Category 5

Finally, the two AND gates 35 and 36 check whether one of the sensors is malfunctioning during actuation of both brakes. If this is the case, the actuation of the associated solenoid value 4 or 5 by way of OR gates 24 and 25, respectively, is prevented and thus pressure builds up. If the output signal from AND gate 35 and 36, respectively, ends because, for example, the vehicle deceleration sensor 28 emits a signal because a certain vehicle deceleration is reached, the trailing edge of this signal sets one of bistable members 32 or 33 and thus keeps the pressure constant at the respective wheel. The other wheel remains uninfluenced. Actuation of the warning light corresponds to that of fault category 3.

In the case of faults according to (a) above, a corresponding signal is given to terminal 40 of OR gate 14 and the ALS is thus shut down immediately.

In the case of faults according to (b) above, a signal is coupled to a terminal 41 which then causes shutdown after a time and pulses the warning light during this time.

Finally, in the case of faults according to (c) above, a signal is given to a terminal 42 which causes the ALS to be shut down when the vehicle stops and warning light 16 to be pulsed until that time. A signal may appear at terminal 10 if either the vehicle is stopped or the control cycle is finished.

The embodiment of FIG. 2 is designed as a hardware circuit. Its functions may of course also be realized by means of a computer and appropriately configured software.

We claim:

1. A brake pressure control system for a motor vehicle, wherein the brake pressure is determined from time to time by behavior of wheels of the vehicle as monitored by means of revolution sensors; the control system is monitored for the occurrence of faults; if there is the occurrence of a fault, limited control operation is initially maintained for a time and then the control system is shut down completely; and wherein the limited control operation and the shutdown of the controller are indicated by different warning signals, characterized in that the motor vehicle is a two-wheeled motor vehicle equipped with separately actuatable front and rear wheel brakes; and if only one of the brakes is actuated and the fault occurs at the revolution sensor of the braked wheel before an onset of a control cycle or during the control cycle, the limited control operation resides in a pulsed pressure buildup at the braked wheel until a predetermined vehicle deceleration is reached.

2. A brake pressure control system according to claim 1, characterized in that, upon the occurrence of a revolution sensor fault before braking, the warning signal of the limited control operation is already set into operation and during this warning phase the same limited control operation is made effective at the wheel having the faulty revolution sensor.

3. A brake pressure control system according to claim 1, characterized in that during limited control operation a warning light is pulsed and during shutdown it is actuated continuously.

4. A brake pressure control system for a motor vehicle, wherein the brake pressure is determined from time to time by behavior of wheels of the vehicle as monitored by means of revolution sensors; the control system is monitored for the occurrence of faults; if there is the occurrence of a fault, limited control operation is initially maintained for a time and then the control system is shut down completely; and wherein the limited control operation and the shutdown of the controller are indicated by different warning signals, characterized in that the motor vehicle is a two-wheeled motor vehicle equipped with separately actuatable front and rear wheel brakes; and if both brakes are actuated and the fault occurs at one of the revolution sensors before an onset of a control cycle or during the control cycle, the limited control operation resides in continued regulation of the brake pressure of the wheel having the properly operating revolution sensor while forming the reference velocity signal from only the one revolution sensor signal and additionally performing a pulsed pressure buildup at the other wheel until a predetermined vehicle deceleration is reached.

5. A brake pressure control system according to claim 4, characterized in that, upon the occurrence of a revolution sensor fault before braking, the warning signal of the limited control operation is already set into operation and during this warning phase the same limited control operation is made effective at the wheel having the faulty revolution sensor.

6. A brake pressure control system according to claim 1, characterized in that during limited control operation a warning light is pulsed and during shutdown it is actuated continuously.

* * * * *